US009313542B2

(12) United States Patent
Miller

(10) Patent No.: US 9,313,542 B2
(45) Date of Patent: Apr. 12, 2016

(54) ELECTRONIC PROGRAM GUIDE GENERATION

(75) Inventor: James Vernon Miller, Marietta, GA (US)

(73) Assignee: COX COMMUNICATIONS, INC., Atlanta, GA (US)

(*) Notice: Subject to any disclaimer, the term of this patent is extended or adjusted under 35 U.S.C. 154(b) by 288 days.

(21) Appl. No.: 12/731,561

(22) Filed: Mar. 25, 2010

(65) Prior Publication Data

US 2011/0239251 A1 Sep. 29, 2011

(51) Int. Cl.
*H04N 5/445* (2011.01)
*H04N 7/18* (2006.01)
*H04N 21/434* (2011.01)
*H04N 21/235* (2011.01)
*H04N 21/236* (2011.01)
*H04N 21/262* (2011.01)
*H04N 21/435* (2011.01)
*H04N 21/84* (2011.01)

(52) U.S. Cl.
CPC ......... *H04N 21/4344* (2013.01); *H04N 21/235* (2013.01); *H04N 21/2355* (2013.01); *H04N 21/23608* (2013.01); *H04N 21/26283* (2013.01); *H04N 21/435* (2013.01); *H04N 21/84* (2013.01)

(58) Field of Classification Search
CPC .......... H04N 21/2143; H04N 21/4622; H04N 21/482
USPC ...................................................... 725/74–85
See application file for complete search history.

(56) References Cited

U.S. PATENT DOCUMENTS

| 5,200,823 | A | * | 4/1993 | Yoneda et al. ................ 348/473 |
| 5,579,055 | A | * | 11/1996 | Hamilton et al. ............... 725/49 |
| 5,914,746 | A | * | 6/1999 | Matthews et al. ............ 725/132 |
| 6,208,335 | B1 | * | 3/2001 | Gordon et al. ................ 715/721 |
| 6,253,375 | B1 | * | 6/2001 | Gordon et al. .................. 725/88 |
| 6,414,720 | B1 | * | 7/2002 | Tsukidate et al. ............ 348/469 |
| 6,481,012 | B1 | * | 11/2002 | Gordon et al. .................. 725/54 |
| 7,607,152 | B1 | * | 10/2009 | Gordon et al. .................. 725/54 |
| 7,634,788 | B2 | * | 12/2009 | Gordon et al. .................. 725/41 |
| 7,697,077 | B2 | * | 4/2010 | Van Horck ............ H03J 1/0058 348/461 |
| 7,962,936 | B2 | * | 6/2011 | Fukuda et al. .................. 725/43 |
| 2002/0056107 | A1 | * | 5/2002 | Schlack ......................... 725/46 |
| 2002/0124071 | A1 | * | 9/2002 | Proehl et al. .................. 709/223 |
| 2003/0005447 | A1 | * | 1/2003 | Rodriguez ...................... 725/51 |
| 2003/0056217 | A1 | * | 3/2003 | Brooks ........................... 725/46 |
| 2003/0093807 | A1 | * | 5/2003 | Nguyen ........................ 725/109 |
| 2003/0137603 | A1 | * | 7/2003 | Suga ............................ 348/553 |
| 2003/0149981 | A1 | * | 8/2003 | Finster et al. .................. 725/46 |
| 2004/0078807 | A1 | * | 4/2004 | Fries ................. H04N 21/8586 725/14 |
| 2004/0220926 | A1 | * | 11/2004 | Lamkin et al. ................... 707/3 |
| 2005/0251825 | A1 | * | 11/2005 | Fukuda et al. .................. 725/44 |
| 2006/0080721 | A1 | * | 4/2006 | Theodorus Budie et al. . 725/114 |

(Continued)

OTHER PUBLICATIONS

Pro:Idiom System Description, pp. 1-14 (Jul. 2009), pp. 1-13.

*Primary Examiner* — Gigi L Dubasky
(74) *Attorney, Agent, or Firm* — Merchant & Gould P.C.

(57) ABSTRACT

An electronic program guide may be provided. A plurality of encoded content streams may be received along with associated program guide information. The content streams may be re-modulated and associated with new channel assignments. Program guide entries for the content streams may be created and/or updated to reflect the new channel assignments. The re-modulated content streams and program guide entries may then be distributed to a plurality of display devices.

20 Claims, 5 Drawing Sheets

(56) References Cited

U.S. PATENT DOCUMENTS

| | | | |
|---|---|---|---|
| 2006/0123455 A1* | 6/2006 | Pai et al. | 725/133 |
| 2007/0061840 A1* | 3/2007 | Walter | H04N 5/50 725/39 |
| 2008/0022341 A1* | 1/2008 | Walter | H04N 7/163 725/113 |
| 2008/0282299 A1* | 11/2008 | Koat et al. | 725/93 |
| 2009/0049474 A1* | 2/2009 | Jinseok | 725/43 |
| 2009/0055868 A1* | 2/2009 | Wehmeyer et al. | 725/40 |
| 2009/0125943 A1* | 5/2009 | White et al. | 725/44 |
| 2009/0133074 A1* | 5/2009 | White et al. | 725/50 |
| 2010/0095322 A1* | 4/2010 | Gordon et al. | 725/30 |
| 2011/0239251 A1* | 9/2011 | Miller | 725/40 |
| 2011/0258663 A1* | 10/2011 | Lemmons et al. | 725/43 |

* cited by examiner

| 210 | | | 200 | | |
|---|---|---|---|---|---|
| 224(A) → Channel | 7:00 | 7:30 | 8:00 | 8:30 |
| 222(A) → 225 | | | | |
| 220(A) ABC (3) | National News | | Lost | |
| 220(B) CBS (5) | News | | Big Bang Theory | Two and a Half Men |
| 220(C) NBC (11) | News | Jay Leno | Chuck | |
| 220(D) FOX (13) | Local News | 'Til Death | American Idol | |
| 220(E) ESPN (45) | College Football | | Sports Center | Draft Coverage |

FIG. 2A

| 210 | | | 230 | | |
|---|---|---|---|---|---|
| 244(A) → Channel | 7:00 | 7:30 | 8:00 | 8:30 |
| 242(A) → 225 | | | | |
| 240(A) ABC (2) | National News | | Lost | |
| 250 Hotel Hospitality (3) | Meeting Room A Replay | | Event Schedule | |
| 240(B) CBS (4) | News | | Big Bang Theory | Two and a Half Men |
| 240(C) NBC (5) | News | Jay Leno | Chuck | |
| 240(D) ESPN (6) | College Football | | Sports Center | Draft Coverage |

FIG. 2B

ELECTRONIC PROGRAM GUIDE GENERATION

BACKGROUND

Program guide generation is an electronically-implemented process for mapping content information associated with one distribution scheme to another distribution scheme. In some situations, electronic program guides may be used to identify times and programs associated with channels in a content distribution scheme such as may be used by a cable television network. If the content is remapped to a new distribution scheme (e.g., by reassigning channel numbers), the program guide provided with the content may appear inaccurate. The conventional solutions have been to not provide the program guide or to display the program guide with inaccurate channel information. This often causes problems as viewers of the content may be unable to easily locate the content they wish to watch.

SUMMARY

Consistent with embodiments of the present invention, systems and methods are disclosed for generating an electronic program guide. A plurality of encoded content streams may be received along with associated program guide information. The content streams may be re-modulated and associated with new channel assignments. Program guide entries for the content streams may be created and/or updated to reflect the new channel assignments. The re-modulated content streams and program guide entries may then be distributed to a plurality of display devices.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

FIG. 2A is a block diagram illustrating an electronic program guide;

FIG. 2B is a block diagram illustrating a locally generated electronic program guide;

DETAILED DESCRIPTION

Figure 1:
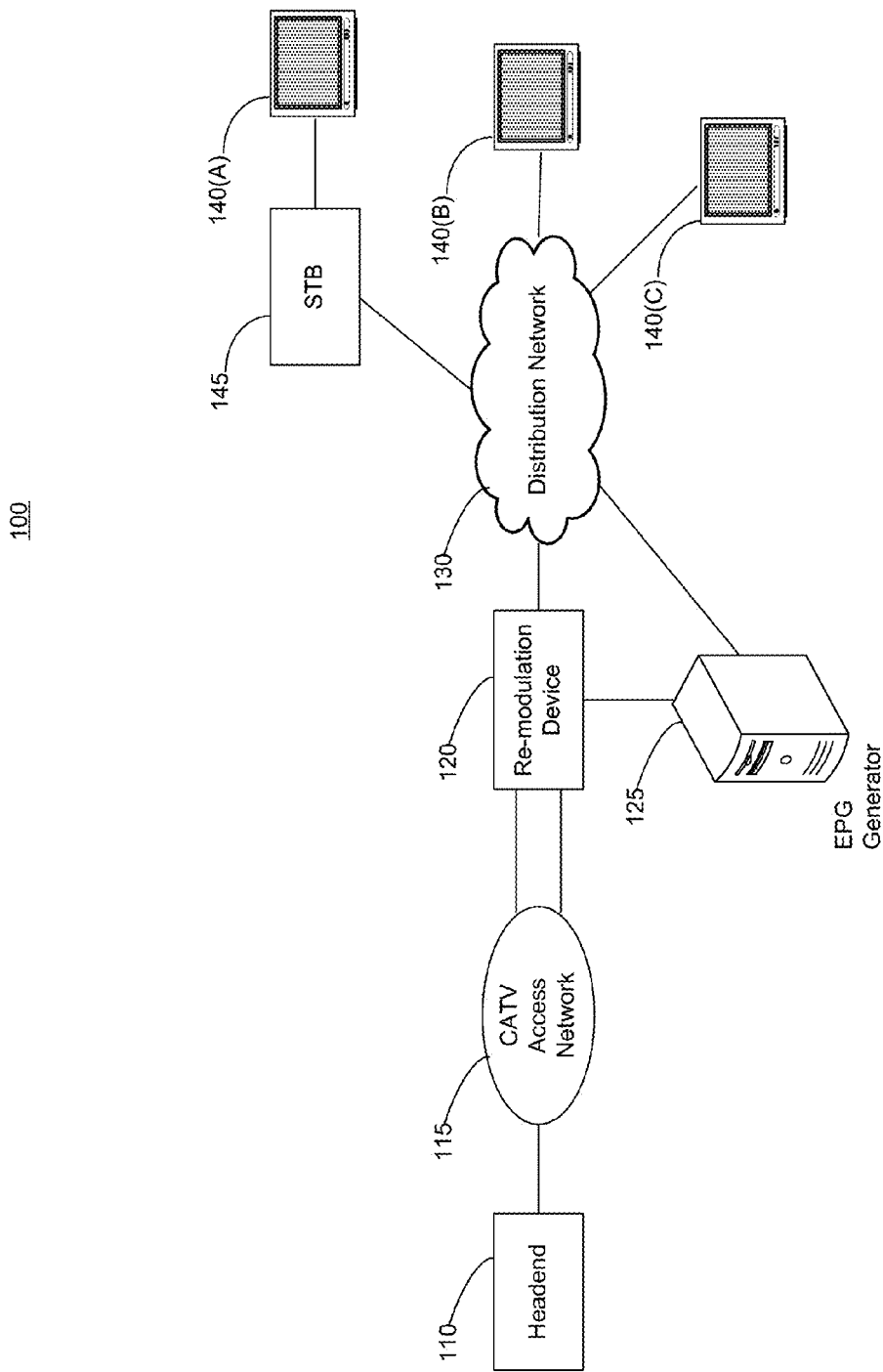
FIG. 1 is a block diagram illustrating an operating environment.

Embodiments of the present invention provide for a method of generating an electronic programming guide. An electronic program guide (EPG) may be created via a re-modulation device or via a secondary device working in conjunction with a re-modulation device that may match a channel map associated with a private content distribution network. For example, a hotel environment may receive a standard cable television network (CATV) feed but may make use of a re-modulation device to re-map the channel numbers, add new channels (e.g., a hotel events schedule channel), and/or remove some content channels from the CATV feed.

Televisions in a commercial environment may use a built-in channel map, on a per TV basis and/or loaded from a common source, that may allow remapping of channel numbers as they are presented on the television to the user during setup of the television. This may be done so that a commercial TV user may use a standard 2 or 3 digit channel number without needing to know the physical RF and/or minor channel number.

For example, in a Quadrature Amplitude modulated (QAM) system, a physical RF channel occupies 6 MHz of spectrum and may contain six standard definition programs. A content program may be transmitted on physical RF channel 32 and on the first multiplexed program. This may be referred to as channel 32-1. The physical RF channel is referred to as the Major Channel number and the program number is referred to as the Minor channel number. The CATV network may map this to a virtual channel number (e.g., channel 324), but the hotel may wish to put channel 32-1 on channel 2 of the commercial televisions. The commercial television may "re-map" channel 32-1 to channel 2 on the television though the commercial TV setup menus allowing the guest to simply tune to channel 2 on the television and the television knows to tune to physical channel 32-1.

The local commercial TV network may receive the CATV feed through a re-modulation device. The re-modulation device may receive a large number of quadrature amplitude modulation (QAM) channels and retransmit those channels and/or content on different frequencies. The CATV network may provide an EPG, but that EPG may display content information associated with the virtual and/or physical channel mappings used by the CATV. Thus, any remappings performed prior to distributing the content through the local commercial TV network may result in inaccurate information if the CATV's EPG is used. In order for an EPG to be useful in the local commercial TV environment, a translation between the channels, be they physical and/or virtual, being output by the re-modulation device and the channel map programmed into the TV for that particular commercial TV network may be used. The re-modulation device or a separate device operating in conjunction with the re-modulation device may thus accept a translation table that allows the EPG channel listing to be modified to match what is programmed in the hotel content distribution scheme.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is simplified block diagram illustrating an operating environment 100 for providing an electronic program guide. Operating environment 100 may comprise a headend 110 associated with a cable television (CATV) service provider, a CATV access network 115, a re-modulation device 120, and an electronic program guide generator 125. CATV access network 115 may comprise a public and/or a private network, such as a cable television distribution network (e.g., a hybrid fiber-coax network), a cellular data network, a metropolitan WiMAX network, and/or the Internet. The re-modulation device 120 may be operative to request, receive, decode, encode, and/or remap channel assignments for program content received from the CATV service provider. EPG generator 125 may be operative to generate EPG data associated with the program content and re-modulated channel mappings. EPG generator 125 may comprise a graphics library associated with providing design information associated with layout, fonts, colors, etc associated with the EPG. EPG generator 125 may comprise a computing device 500 as described below with respect to FIG. 5. Consistent with embodiments of the invention, EPG generator 125 may comprise a software application (i.e., a series of instructions configured for execution by a processing unit) associated with another component, such as a re-modulation device 120.

Operating environment 100 may further comprise a distribution network 130 and a plurality of display devices 140(A)-140(C). Distribution network 130 may comprise an RF network for providing re-modulated content and/or an EPG to display devices 140(A)-140(C). Display devices 140(A)-140(C) may comprise, for example, televisions, projectors, and/or other video devices located in a commercial TV network. Consistent with embodiments of the invention, display devices 140(A)-140(C) may be coupled to a set-top box (STB) 145 for decoding the program content and/or a decoding device may be integrated into display devices 140(A)-140(C).

FIG. 2A is an illustration of an EPG 200. EPG 200 may be provided by a CATV service provider and may comprise a heading row 210 and a plurality of channel information rows 220(A)-220(E). Each of channel information rows 220(A)-220(E) may comprise a channel name 222(A), a channel number 224(A), and program and schedule information, such as a content entry 225. Channel number 224(A) may comprise a physical and/or a virtual channel number (e.g., the channel number a viewer may input into STB 145 and/or one of display devices 140(A)-140(C) to tune to that channel). Content entry 225 may comprise information associated with the content such as a title, actors, genre, episode description, and/or duration. Content entry 225 may be formatted with font and/or color information, such as by assigning a background color according to a genre of the content.

FIG. 2B is an illustration of a locally generated EPG 230. Locally generated EPG 230 may be created and distributed across a local premises and may comprise a second plurality of channel information rows 240(A)-240(E). Each of channel information rows 240(A)-240(D) may comprise a channel name 242(A), a channel number 244(A), and program and schedule information, such as content entry 225. Locally generated EPG 230 may comprise some of the same channel and programming information associated with EPG 200. Design information in locally generated EPG 230, such as colors, fonts, and layouts may be changed from EPG 200, such as by using different background colors for program genres. Consistent with embodiments of the invention, EPG 200 and locally generated EPG 230 may use a common graphics library and/or separate graphics libraries. That is, EPG 200 and locally generated EPG 230 may appear to use the same design or locally generated EPG 230 may use a different design than that received from the CATV service provider. Locally generated EPG 230 may also display local content information such as a local channel information row 250. Local channel information row may display programming information associated with content provided by the local premises.

Figure 3:
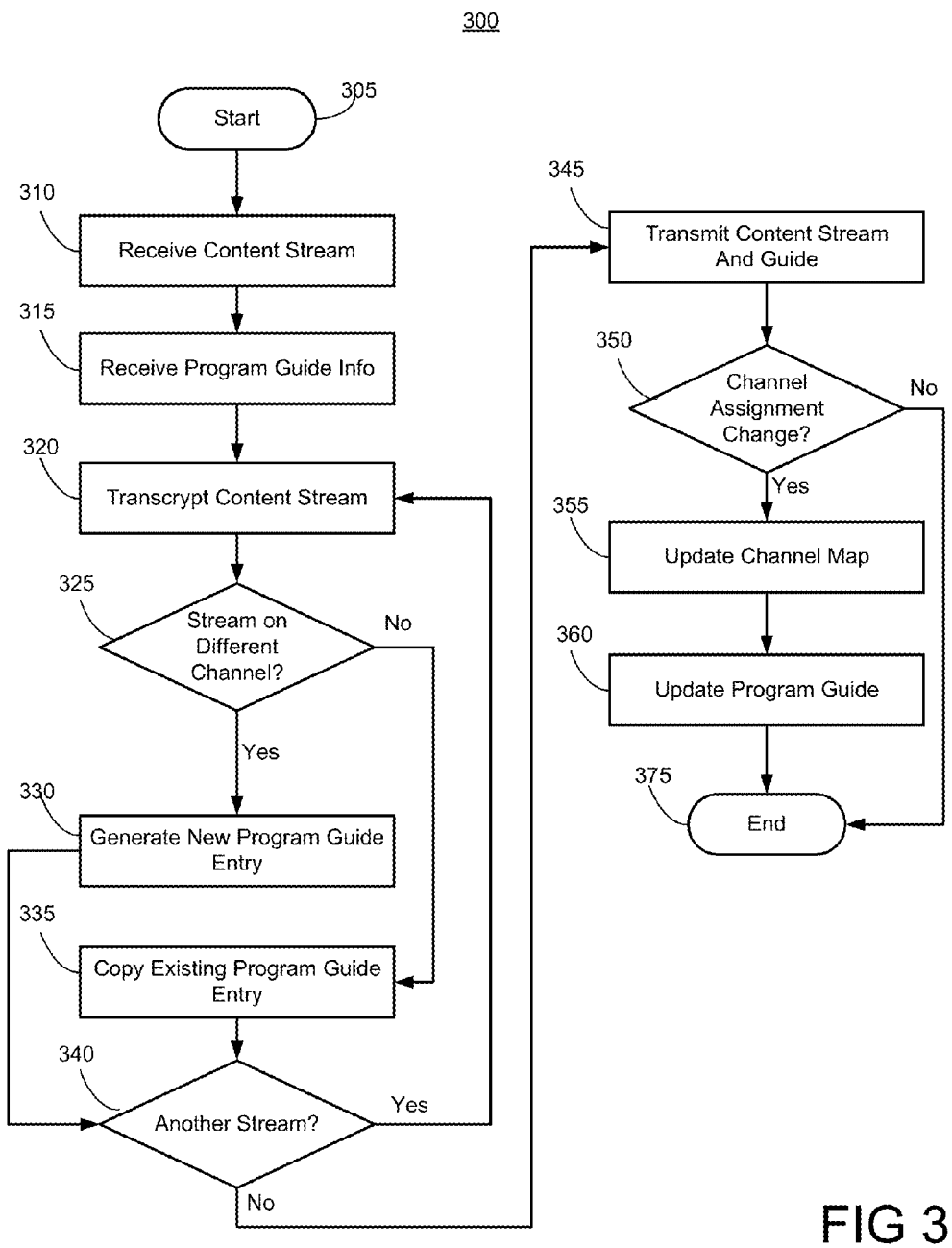
FIG. 3 is a flow chart showing an illustrative routine for providing content placeholder markers.

FIG. 3 is a flow chart setting forth the general stages involved in method 300 consistent with embodiments of the invention for providing content placeholder markers. Method 300 may be implemented using computing device 500 as described in more detail below with respect to FIG. 5. Ways to implement the stages of method 300 will be described in greater detail below. Method 300 may begin at starting block 305 and proceed to stage 310 where computing device 500 may receive a content stream. For example, re-modulation device 120 may receive programming from a CATV provider.

From stage 310, method 300 may advance to stage 315 where computing device 500 may receive program guide information. For example, re-modulation device 120 may receive an electronic program guide (EPG) from the CATV provider. The EPG may comprise information such as a physical channel, a virtual channel, and content information (e.g., schedule, duration, actors, content description, etc).

From stage 315, method 300 may advance to stage 320 where computing device 500 may transcript the content stream. For example, re-modulation device 120 may decrypt the content stream associated with a first physical channel and re-encrypt the content stream for transmission on a new physical channel. Consistent with embodiments of the invention, the content stream may remain associated with the same physical channel and/or the same virtual channel. The content stream may also remain associated with the same physical channel but be assigned to a new virtual channel. The virtual channel assignments for a given physical channel may be stored and processed by, for example, STB 145 and/or an integrated cable card associated with display device 140(B).

From stage 320, method 300 may advance to stage 325 where computing device 500 may determine whether the content stream has been re-modulated to a different virtual channel. For example, EPG generator 125 may determine that a re-modulated content stream had been associated with virtual channel 13 but it now associated with virtual channel 6, thus rendering the EPG received from the CATV provider inaccurate.

If the content stream has been associated with a new virtual channel, method 300 may advance to stage 330 where computing device 500 may generate a new program guide entry. For example, EPG generator 125 may use a graphical display creator software module to generate colors, fonts, positions, and other layout information for program guide information extracted from the EPG received from the CATV provider. Otherwise, method 300 may advance to stage 335 where computing device 500 may copy an existing program guide entry. That is, EPG generator 125 may simply copy the program guide entry from the EPG received from the CATV provider to a new EPG. Consistent with embodiments of the invention, EPG generator 125 may overlay new information on the EPG received from the CATV provider when the virtual channel differs but leave the entries alone where the virtual channel is the same to generate a new, local EPG.

From stage 330 or 335, method 300 may advance to stage 340 where computing device 500 may determine whether there are any more content streams. For example, re-modulation device 120 may loop through each of the content streams received from the CATV provider, returning to stage 320 and re-mapping the channel information for each EPG entry as necessary.

After processing each of the content streams at stages 320-340, method 300 may advance to stage 345 where computing device 500 may transmit the content stream and locally generated EPG. For example, re-modulation device 120 and/or EPG generator 125 may broadcast the re-modulated content streams and locally generated EPG over distribution network 130.

From stage 345, method 300 may advance to stage 350 where computing device 500 may determine whether a channel assignment for one and/or more of the re-modulated content streams has changed. For example, a configuration controlling the assignment of virtual channel numbers to each of the received content streams may be updated. Re-modulation device 120 may rely on this configuration for re-modulating the incoming content streams and may detect the change in the configuration. If not, method 300 may then end at stage 375.

If the channel assignment change is detected, method 300 may advance to stage 355 where computing device 500 may update a channel map. For example, re-modulation device 120 may update a stored channel map comprising information pairing physical and/or virtual channel assignments associated with content streams as received from the CATV provider with physical and/or virtual channel assignments associated with distributing the content streams across the local premises.

From stage 355, method 300 may advance to stage 360 where computing device 500 may update the program guide. For example, program guide entries may be generated for the content stream's programming, as described above with respect to stage 330, for the new channel assignment. Method 300 may then end at stage 375.

Figure 4:
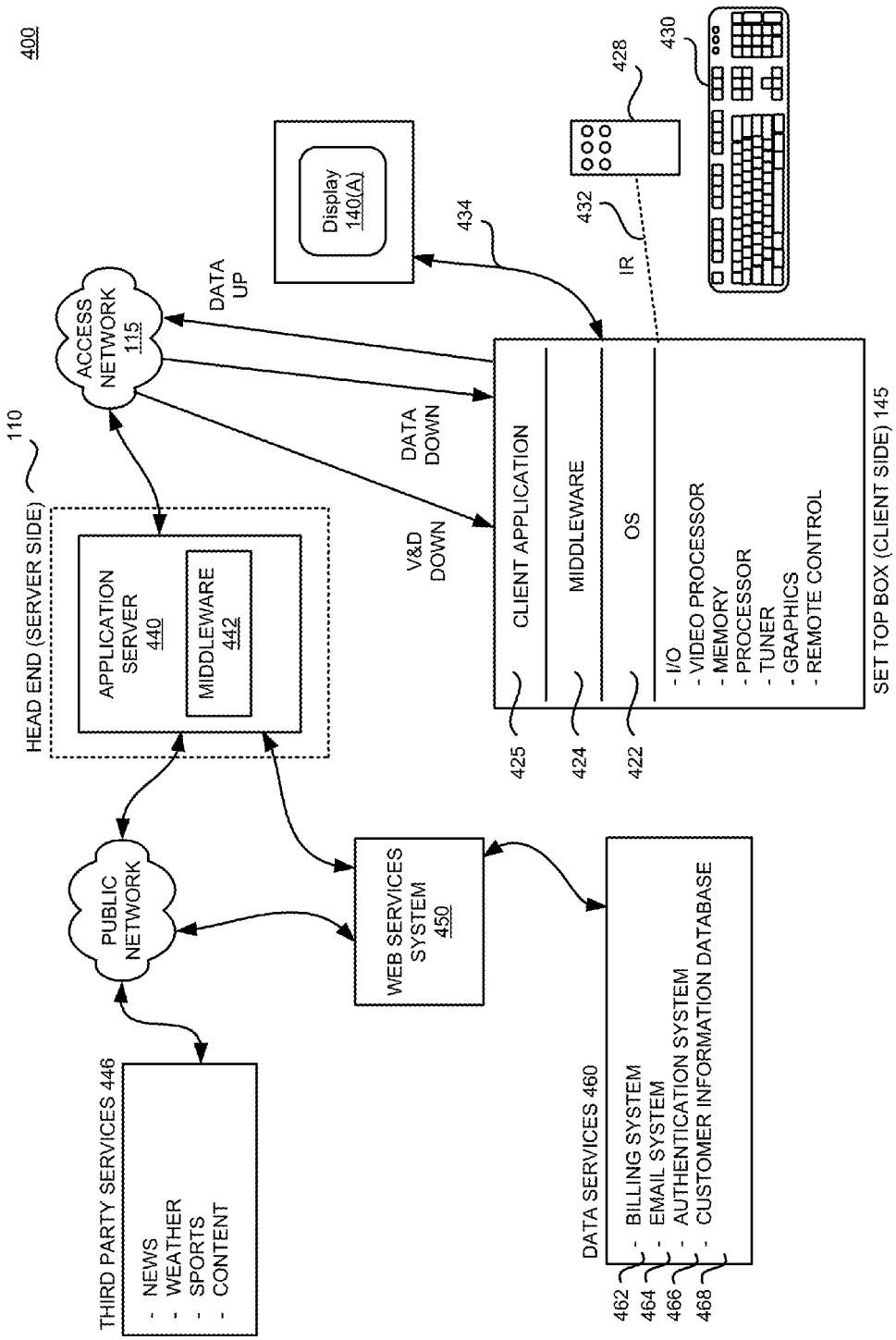
FIG. 4 is a block diagram of a cable television system.

FIG. 4 is a block diagram of a cable television (CATV) system 400 for providing digital and/or analog video programming, information content and interactive television services. These services may be transmitted via access network 115, such as a hybrid fiber coax (HFC) network, to a display device 140(A) for consumption by a cable television/services system customer. For example, display device 140(A) may be located at customer premises 200. Access network 115 may combine both optical fiber and coaxial cable lines. Typically, optical fiber runs from a cable headend 110 to neighborhoods of 500 to 2,000 customers. Coaxial cable runs from the optical fiber feeders to each customer. According to embodiments of the present invention, the functionality of access network 115 allows for efficient bidirectional data flow between a client-side set-top box 145 and a server-side application server 440 of the present invention. Set-top box 145 may comprise a terminal device such as terminal device 155 and/or terminal devices 225(A)-225(C).

CATV system 400 may comprise a distributed client-server computing system for providing video and data flow across access network 115 between server-side services providers (e.g., cable television/services providers) via headend 110 and a client-side customer via client-side set-top box (STB) 145 functionally connected to a customer receiving device, such as display device 140(A). CATV systems 400 may provide a variety of services across access network 115 including traditional digital and analog video programming, telephone services, high speed Internet access, video-on-demand, and information services.

On the client side of CATV system 400, digital and analog video programming and digital and analog data may be provided to display device 140(A) via set-top box (STB) 145. Interactive television services that allow a customer to input data to CATV system 400 may likewise be provided by STB 145. As illustrated in FIG. 4, STB 145 may comprise a multipurpose computing device having a computer processor, memory and an input/output mechanism. The input/output mechanism may receive input from server-side processes via access network 115 and from customers via input devices such as a remote control device 428 and a keyboard 430. Remote control device 428 and keyboard 430 may communicate with the STB 145 via a suitable communication transport such as an infrared connection 432. STB 145 may also include a video processor for processing and providing digital and analog video signaling to display device 140(A) via a cable communication transport 434. A multi-channel tuner may be provided for processing video and data to and from STB 145 and headend 110.

STB 145 may also include an operating system 422 for directing the functions of STB 145 in conjunction with a variety of client applications. For example, if a client application 425 requires a news flash from a third-party news source to be displayed on display device 140(A), operating system 422 may cause the graphics functionality and video processor of STB 145, for example, to output the news flash to display device 140(A) at the direction of client application 425 responsible for displaying news items.

Because a variety of different operating systems 422 may be utilized by a variety of different brands and types of set-top boxes, a middleware layer 424 may be provided to allow a given software application to be executed by a variety of different operating systems. According to an embodiment of the present invention, middleware layer 424 may include a set of application programming interfaces (API) that are exposed to client application 425 and operating system 422 that allow client application 425 to communicate with operating system 422 through common data calls understood via the API set. As described below, a corresponding middleware layer may be included on the server side of CATV system 400 for facilitating communication between server-side application server 440 and client-side STB 145. A middleware layer 424 of server-side application server 440 and middleware layer 424 of client-side STB 145 may format data passed between the client side and server side according to the Extensible Markup Language (XML). As should be appreciated, XML is only one example of data formatting, data passed between the client side and the server side may be formatted according to any other suitable formatting language or standard.

According to one embodiment, the set-top box 145 passes digital and analog video and data signaling to the display device 140A, such as a television, via a one-way communication transport 134. STB 145 may pass digital and analog video and data signaling to the display device 140(A) via communication transport 434. According to an embodiment, bidirectional communication may be accomplished between the STB 145 and the display device 140A. For example, high-definition multimedia interface (HDMI) ports on the STB 145 and display device 140A allow for bidirectional data communications between the devices. STB 145 may receive video and data from the server side of CATV system 400 via access network 115 through a video/data downlink and data via a data downlink. STB 145 may transmit data from the client side of CATV system 400 to the server side of CATV system 400 via access network 115 via one data uplink. The video/data downlink may comprise an "in band" downlink that allows for digital and analog video and data signaling from the server side of CATV system 400 through access network 115 to set-top box 145 for use by STB 145 and for distribution to display device 140(A). The "in band" signaling space may operate at a variety of frequencies. According to one embodiment, the "in band" signaling space may operate at a frequency between 54 and 1000 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 4, between access network 115 and set-top box 145 may comprise "out of band" data links. The "out of band" frequency range generally lies between zero and 54 megahertz. Data flow between client-side set-top box 145 and server-side application server 440 is typically passed through the "out of band" data links. Alternatively, an "in band" data carousel may be positioned in an "in band" channel into which a data feed may be processed from server-side application server 440 through access network 115 to client-side STB 145. Operation of data transport between components of CATV system 400, described with reference to FIG. 4, is well known to those skilled in the art.

Data passed between CATV system 400 backend components such as headend 110 and CATV system 400 front end components such as STB 145 may be passed according to the Data Over Cable Service Interface Specification (DOCSIS). DOCSIS provides for a mechanism for data transport over a cable system such as CATV 400, illustrated in FIG. 4. Among other things, DOCSIS allows for the passing of digital communications and Internet connectivity over access network 115.

Referring still to FIG. 4, headend 110 of the CATV system 400 may be positioned on the server side of CATV system 400 and may include hardware and software systems responsible for originating and managing content for distributing through access network 115 to client-side STB 145 for presentation to customers via display device 140(A). As described above, a number of services may be provided by CATV system 400, including digital and analog video programming, interactive television services, telephone services, video-on-demand services, targeted advertising, and provision of information content.

Application server 440 may comprise a general-purpose computing system operative to assemble and manage data sent to and received from client-side set-top box 145 via access network 115. As described above with reference to set-top box 145, application server 440 may comprise middleware layer 424 for processing and preparing data from headend 110 of CATV system 400 for receipt and use by client-side set-top box 145. For example, application server 440 via the middleware layer 424 may obtain data from one and/or more of a plurality of third-party services 446 via network 115 for transmitting to a customer through access network 115 and set-top box 145. For example, a weather report from a third-party weather service may be downloaded by application server 440 via network 115. When application server 440 receives the downloaded weather report, middleware layer 424 may be utilized to format the weather report for receipt and use by set-top box 145. Data obtained and managed by middleware layer 424 of application server 440 may be formatted according to the Extensible Markup Language and may be passed to set-top box 145 through access network 115 where the XML-formatted data may be utilized by client application 425 in concert with middleware layer 424, as described above. A variety of third-party services 446 data, including news data, weather data, sports data and other information content may be obtained by application server 440 via distributed computing environments such as network 115 for provision to customers via access network 115 and set-top box 145.

According to embodiments of the present invention, the application server 440 may obtain customer profile data from services provider data services 460 (which may comprise an implementation of profile server) for preparing a customer profile that may be utilized by the set-top box 145 for tailoring certain content provided to the customer. According to embodiments of the present invention, a customer profile may include communications applications provisioned on networked STBs, as well as, designations of individual STBs in a home, business or facility (e.g., "kitchen STB," "bedroom STB," "office STB," and the like).

A plurality of provider data services 460 may include a number of services operated by the services provider of CATV system 400 that may include data on a given customer. For example, a billing system 462 may include information such as a customer's name, street address, business identification number, Social Security number, credit history, and information regarding services and products subscribed to by the customer. An electronic mail system 464 may contain information such as electronic mail addresses, high-speed Internet access subscription information and electronic mail usage data. An authentication system 466 may include information such as secure user names and passwords utilized by customers for access to network services. A customer information database 468 may include general information about customers such as place of employment, business address, business telephone number and demographic information such as age, gender, educational level, and the like. As should be understood by those skilled in the art, the disparate data services systems 462, 464, 466, 468 are illustrated as a collection of data services for purposes of example only. The example data services systems comprising data services 460 may operate as separate data services systems, which communicate with a web services system (described below) along a number of different communication paths and according to a number of different communication protocols.

Referring still to FIG. 4, a web services system 450 is illustrated between application server 440 and data services 460. Web services system 450 may serve as a collection point for data requested from each of the disparate data services systems comprising data services 460. When application server 440 requires customer profile data from one or more of data services 460 for preparation or update of a customer profile, application server 440 passes a data query to web services system 450. Web services system 450 formulates a data query to each of the available data services systems for obtaining any available data for a given customer as identified by a set-top box identification associated with the customer. Web services system 450 may serve as an abstraction layer between the various data services systems and application server 440. That is, application server 440 is not required to communicate with the disparate data services systems, nor is application server 440 required to understand the data structures or data types utilized by the disparate data services systems. Web services system 450 may be operative to communicate with each of the disparate data services systems for obtaining necessary customer profile data. The customer profile data obtained by the web services system is assembled and is returned to application server 440 for ultimate processing via middleware layer 424, as described above.

An embodiment consistent with the invention may comprise a system for providing a content placeholder. The system may comprise a memory storage and a processing unit coupled to the memory storage. The processing unit may be operative to receive a plurality of channel streams, each associated with a physical and/or a virtual channel, receive content information associated with at least one of the plurality of channel streams, transcrypt at least one channel stream to associate it with a new channel, associate the content information for the at least one channel streams with the new channel, and generate a program guide comprising the content information associated with the at least one channel stream and the new channel. The content information associated with the at least one channel stream may be associated with the new channel according to a channel map comprising data identifying the new channel associated with an existing channel for the channel stream. For example, the existing channel may comprise a physical channel of 32.1 and a virtual channel of 702 while the new channel may comprise a physical channel of 82.3 and a virtual channel of 13. The new channel may be distributed across a local premises content distribution network, such as may be used to distribute television content to televisions in a hotel premises. If the new channel assignment for the content stream changes, the channel map may be updated to reflect the new assignment. Consistent with embodiments of the invention, the channel map may be generated by the provider of the content streams and/or an operator of the local premises content distribution network. The processing unit may be further operative to encode one and/or more new content streams from different content providers and add program information associated with each of the new content streams to the program guide. The program information may be received from the associated content provider.

Another embodiment consistent with the invention may comprise a system for creating a content placeholder marker. The system may comprise a memory storage and a processing unit coupled to the memory storage. The processing unit may be operative to receive a content stream associated with a virtual channel, receive a guide entry comprising program information associated with the encoded content stream and the virtual channel, and determine whether the encoded content stream is assigned for distribution on a different virtual channel. If so, the processing unit may be operative to create a new guide entry comprising the program information associated with the encoded content stream and the different virtual channel. The determination may be made according to a channel map file comprising an entry associating the virtual channel with the different virtual channel.

The processing unit may be operative to generate the new guide entry according to a shared graphics library (e.g., a graphics library used by both the local premises and the content provider) and/or a local graphics library (e.g., a graphics library used by the local premises but not the content provider). The graphics library may comprise layout information such as positioning information, fonts, and/or colors.

Yet another embodiment consistent with the invention may comprise a system for providing a content placeholder. The system may comprise a memory storage and a processing unit coupled to the memory storage. The processing unit may be operative to receive a plurality of encoded content streams, receive a program guide comprising content information associated with each of the plurality of encoded content streams, transcrypt at least one of the plurality of encoded content streams, generate a program guide entry associated with the transcrypted at least one of the plurality of encoded content streams according to the received program guide, and transmit the transcrypted at least one of the plurality of encoded content streams and the program guide entry to a plurality of display devices. The program guide entry may be generated according to a channel map comprising a first channel assignment and a second channel assignment, wherein the first channel assignment comprises a channel assignment associated with the at least one of the plurality of encoded content streams prior to being transcrypted and the second channel assignment comprises a channel assignment associated with the at least one of the plurality of encoded content streams after being transcrypted. The channel assignments may comprise physical and/or virtual channel assignments. The processing unit may be further operative to the processing unit is further operative to encode a new content stream, add a new program guide entry associated with the new content stream, and transmit the new encoded content stream and the new program guide entry to the plurality of display devices.

Figure 5:
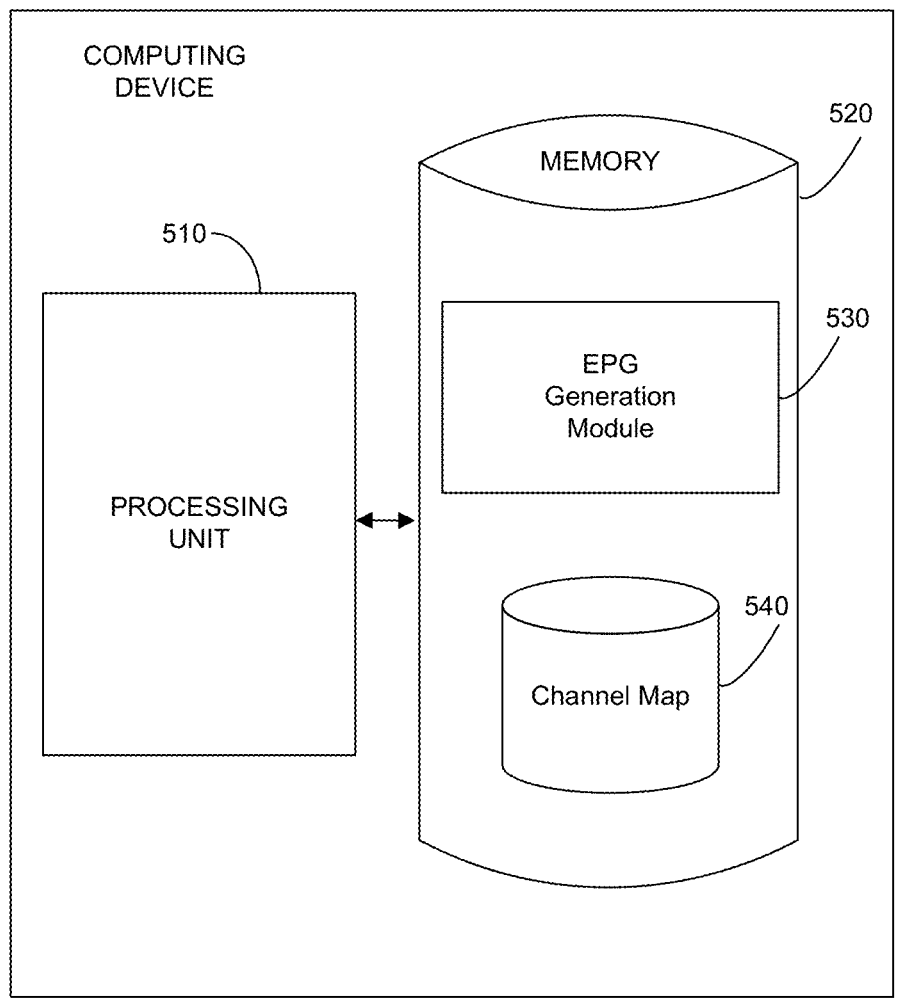
FIG. 5 is a block diagram of a computing device.

FIG. 5 illustrates a computing device 500. Computing device 500 may include a processing unit 510 and a memory unit 520. Memory 520 may include, for example, an EPG generation software module 530 and a channel map data store 540. While executing on processing unit 510, EPG generation software module 530 may perform processes for retrieving, updating, and/or transmitting billing and/or placeholder information, including, for example, one or more stages included in a method 300 described above with respect to FIG. 3. Furthermore, EPG generation software module 530 may be executed on or reside in any element shown and/or described with respect to FIG. 1. Moreover, any one or more of the stages included in method 300 may be performed on any element shown in FIG. 1.

Computing device 500 may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

As described herein, methods and systems are provided for generating an electronic programming guide. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

I claim:

1. A method for providing a local program guide, the method comprising:
   providing a program guide from a headend of a television service provider to an EPG generator, wherein the EPG generator generates local program guides for distribution to a plurality of televisions in a local commercial environment rather than to subscribers of the television service provider;
   generating a private content distribution network for providing content via a plurality of remapped channels to the plurality of televisions in the local commercial environment by:
   receiving at a re-modulation device the program guide from the television service provider and a plurality of channel streams from the headend of the television service provider, the plurality of channel streams are each associated with a physical channel and a virtual channel in a channel map, wherein one of the plurality of channel streams is associated with a first channel;
   receiving content information associated with the one of the plurality of channel streams from the television service provider;
   re-modulating via the re-modulation device the one of the plurality of channel streams to disassociate the one of the plurality of channel streams with the first channel and to associate the one of the plurality of channel streams with a new channel;
   associating the content information associated with the one of the plurality of channel streams to the new channel;

receiving at the re-modulation device a second channel stream from a local content source associated with the commercial environment;

receiving content information associated with the second channel stream from the local content source;

re-modulating via the re-modulation device the second channel stream from the local content source to associate the second channel stream with the first channel;

associating the content information associated with the second channel stream to the first channel; and generating, via the EPG generator, a local program guide having a grid reflecting times of available content and wherein different content is selectable from the local program guide while moving across the grid in time, the local program guide comprising the content information associated with the one of the plurality of channel streams on the new channel and the content information associated with the second channel stream on the first channel;

distributing the program guide from the headend of the television service provider to the subscribers of the television service provider wherein the program guide of the television service provider comprises the plurality of channel streams associated with the first and second channels;

distributing over the private content distribution network the re-modulated first content stream, the re-modulated second content stream and the local program guide from the EPG generator to provide the content via the plurality of remapped channels to the plurality of televisions in the local commercial environment; and displaying the local program guide and tuning to the one of the plurality of channel streams received from the headend in response to selecting from the local program guide a program associated with the new channel or tuning to the second channel stream from the local content source in response to selecting from the local program guide another program associated with the first channel.

2. The method of claim 1, wherein the content information associated with the one of the plurality of channel streams is associated with the new channel according to the channel map comprising data identifying the new channel for the one of the plurality of channel streams.

3. The method of claim 2, wherein the channel map is created according to a local premises content distribution network.

4. The method of claim 3, further comprising:
re-modulating a second one of the plurality of channel streams to associate the one of the plurality of channel streams with a second new channel; and
updating the channel map to reflect the association of a second one of the plurality of channel streams with the second new channel.

5. The method of claim 2, wherein the channel map is created by a provider of the plurality of channel streams and comprises a physical channel associated with each of the plurality of channel streams, a virtual channel associated with each of the plurality of channel streams, and the new channel associated with the one of the plurality of channel streams.

6. The method of claim 1, further comprising:
encoding a new content stream for distribution with the one of the plurality of channel streams.

7. The method of claim 6, further comprising adding program information associated with the new content stream to the program guide.

8. The method of claim 1, further comprising:
encoding a plurality of new content streams, wherein each of the new content streams are received from an associated content provider; and
adding program information associated with each of the plurality of new content streams to the program guide, wherein the program information associated with each of the plurality of new content streams is received from the associated content provider.

9. A system for providing a local program guide, the system comprising:
a program guide from a headend of a television service provider provided to an EPG generator, wherein the EPG generator generates local program guides for distribution to a plurality of televisions in a local commercial environment rather than to subscribers of the television service provider;
a memory storage; and
a processing unit coupled to the memory storage, wherein the processing unit is operative to:
generate a private content distribution network for providing content via a plurality of remapped channels to the plurality of televisions in the local commercial environment by the processing unit being operative to:
receive the program guide and a first encoded content stream from the headend of a television service provider, the first encoded content stream being associated with a first channel in a channel map comprising a physical channel and a virtual channel for each of encoded content streams received from the headend of the television service provider;
receive a first guide entry comprising program information associated with the first encoded content stream and the first channel;
determine whether the first encoded content stream is assigned for distribution on the first virtual channel;
receive a second encoded content stream from a local content source associated with the local commercial environment, the second encoded content stream being associated with a second channel;
receive a second guide entry comprising the program information associated with the second encoded content stream;
determine whether the second encoded content stream is assigned for distribution on a second virtual channel;
in response to determining that the first encoded content stream is assigned for distribution on the first virtual channel, create a new first guide entry comprising the program information associated with the first encoded content stream and the first virtual channel;
in response to determining that the second encoded content stream is assigned for distribution on the second virtual channel, create a new second guide entry comprising the program information associated with the second encoded content stream and the second virtual channel; and
generating, via the EPG generator, a local program guide having a grid reflecting times of available content and wherein different content is selectable from the local program guide while moving across the grid in time;
distributing the program guide from the headend of the television service provider to the subscribers of the television service provider wherein the program guide of the television service provider comprises the first and second guide entries associated with the first and second encoded content streams, respectively received from the headend of the television service provider;

distribute over the private content distribution network the first content stream, the second content stream and the local program guide from the EPG generator over the private content distribution network to provide the content via the plurality of remapped channels to the plurality of televisions in the local commercial environment; and displaying the local program guide with the new first and second guide entries and tuning to either of the first encoded content stream from the headend or the second encoded content stream from the local content source in response to selecting from the local program guide a program associated with either of the new first or second guide entries.

10. The system of claim 9, wherein determining whether the first encoded content stream is assigned for distribution on the first virtual channel comprises determining whether the channel map comprises an entry associating the first virtual channel with the first virtual channel.

11. The system of claim 10, wherein the channel map further comprises a physical channel associated with the first encoded content stream.

12. The system of claim 9, wherein the new first guide entry comprises at least one graphical layout instruction.

13. The system of claim 12, wherein the at least one graphical layout instruction comprises at least one of the following: a position, a font, a text color, and a background color.

14. The system of claim 13, wherein the graphical layout instruction is associated with a shared graphics library.

15. The system of claim 13, wherein the graphical layout instruction is associated with a local graphics library.

16. A system for providing a local program guide, the system comprising:
 a program guide from a headend of a television service provider provided to an EPG generator, wherein the EPG generator generates local program guides for distribution to a plurality of televisions in a local commercial environment rather than to subscribers of the television service provider;
 a memory storage; and
 a processing unit coupled to the memory storage, wherein the processing unit is operative to:
 generate a private content distribution network for providing content via a plurality of remapped channels to the plurality of televisions in the commercial environment by the processing unit being operative to:
 receive a plurality of encoded content streams from a television service provider, wherein each of the plurality of encoded channel streams is associated with a first channel in a channel map comprising a physical channel and a virtual channel for the each of the plurality of encoded channel streams;
 receive the program guide comprising content information associated with each of the plurality of encoded content streams from the television service provider;
 re-modulate one of the plurality of encoded content streams to disassociate the one of the plurality of encoded content streams from association with the first channel and to associate the one of the plurality of encoded content streams with a second channel;
 generate a first program guide entry associated with the re-modulated one of the plurality of encoded content streams according to the received program guide;
 receive a second channel stream from a local content source associated with the local commercial environment, wherein the second channel stream is associated with a third channel;
 receive content information associated with the second channel stream from the local content source;
 re-modulate the second channel stream from the local content source to associate the second channel stream with a fourth channel;
 generating a second program guide entry associated with the re-modulated second channel stream;
 distributing the program guide from the headend of the television service provider to the subscribers of the television service provider without a channel associated with the local content source;
 distribute over the private content distribution network the re-modulated one of the plurality of encoded content streams, the re-modulated second channel stream, and the local program guide from the EPG generator including the first program guide entry and the second program guide entry over the private content distribution network to provide the content via the plurality of remapped channels to the plurality of display devices in the local commercial environment to display currently available content; and
 displaying the local program guide and tuning to either the re-modulated one of the plurality of encoded content streams from the service provided in response to selection from the local program guide a program associated with the second channel or tuning to the re-modulated second channel stream from the local content source in response to selection from the local program guide of another program associated with the fourth channel.

17. The system of claim 16, wherein the program guide entry is generated according to the channel map comprising a first channel assignment and a second channel assignment, wherein the first channel assignment comprises a channel assignment associated with the at least one of the plurality of encoded content streams prior to being re-modulated and the second channel assignment comprises a channel assignment associated with the at least one of the plurality of encoded content streams after being re-modulated.

18. The system of claim 17, wherein the processing unit is further operative to:
 detect a change in the second channel assignment; and
 update the program guide entry according to the changed second channel assignment.

19. The system of claim 17, wherein the first channel assignment and the second channel assignment each comprise at least one of the following: a virtual channel assignment and a physical channel assignment.

20. The system of claim 16, wherein the processing unit is further operative to:
 encode a new content stream;
 add a new program guide entry associated with the new content stream; and
 transmit the new encoded content stream and the new program guide entry to the plurality of display devices.

* * * * *